United States Patent [19]

Nicolaisen

[11] 4,332,989
[45] Jun. 1, 1982

[54] SAFETY ARRANGEMENT FOR SYSTEMS HAVING PARTS SPATIALLY MOVED

[75] Inventor: Peter Nicolaisen, Stuttgart, Fed. Rep. of Germany

[73] Assignee: Fraunhofer Gesellschaft zur Forderung der argewandten Forschung e.v., Munich, Fed. Rep. of Germany

[21] Appl. No.: 100,774

[22] Filed: Dec. 6, 1979

[30] Foreign Application Priority Data

Dec. 16, 1978 [DE] Fed. Rep. of Germany ....... 2854459

[51] Int. Cl.$^3$ ...................... H01H 3/16; H01H 13/70
[52] U.S. Cl. .................................. 200/47; 200/159 B
[58] Field of Search ..................... 200/47, 181, 159 B, 200/334, 61.58 R

[56] References Cited

U.S. PATENT DOCUMENTS

| | | |
|---|---|---|
| 3,859,485 | 1/1975 | Blinklide .................... 200/61.58 R |
| 3,879,586 | 4/1975 | Du Rocher et al. ............ 200/159 B |
| 3,979,570 | 9/1976 | Hyodo ........................... 200/159 B |
| 4,158,117 | 6/1979 | Quilliam et al. .................... 200/181 |
| 4,200,779 | 4/1980 | Zakurdaev et al. ................. 200/181 |

FOREIGN PATENT DOCUMENTS 1454805  11/1976  United Kingdom ............ 200/159 B Primary Examiner—Willis Little
Attorney, Agent, or Firm—John C. Smith, Jr.

[57] ABSTRACT

A safety arrangement for systems with parts freely movable spatially, in particular for manipulation devices and driverless transportation devices, includes electric switch elements which upon collision of moved parts with persons or objects cause a control signal which shuts down the moved parts or initiates an emergency operation program which causes for instance a sequence of movements opposite to the direction of collision. Each of the electric switch elements is constituted by a per se known initially electrically insulating plastic layer which turns electrically conductive upon being pressure strained and which is provided planarly between two electrode layers at those locations of the moved parts which as a result of their shapes and motion energy represent a risk upon collision.

5 Claims, 2 Drawing Figures

SAFETY ARRANGEMENT FOR SYSTEMS HAVING PARTS SPATIALLY MOVED

BACKGROUND OF THE INVENTION

This invention relates to a safety arrangement for systems having parts spatially moved, in particular for manipulation devices, such as industrial roboters, and for self-driving transportation devices, including electric switch elements which cause a signal upon collision of the moved parts with persons or objects, said signal shutting down the moved parts or initiating an emergency operation program which causes for instance a sequence of motions opposite to the direction of collision.

Such safety arrangements are known and find general application in particular for securing automatic doors at elevators and public transportation vehicles. The electric switch elements are mostly deviced as resiliently supported strips or sensors or strips or sensors loaded with a predetermined force. The efficiency of such arrangements has as a requirement that the site of collision at which the moved parts may strike the persons or objects is known at least regarding a plane or a line.

A safety arrangement is also known from German Offenlegungsschrift No. 2,644,608, wherein, however, the site of collision at least regarding a line or plane must be such as is the case for instance for a roll gate. Therein, a signal generator arranged substantially along the entire leading edge of the roll gate is used. The signal generators are not suited to operate as area signal generators since a resistance variation in relationship to the overall resistance is detected in the non-compressed condition. In the case of large-volume constructions as required for instance for safeguarding industrial roboters unfavorable conditions result between the resistance variation relative to the overall resistance, so that either a high sensitivity of the system is required and thus no proper response is obtained or such a large volume must be deformed that for instance a touching of the safety arrangement with a finger causes no shut-down signal.

SUMMARY OF THE INVENTION

It is, therefore, an object of the present invention to provide a safety arrangement of the type mentioned above which is constructed in such a way that even for a not exactly predictable site of collision a safe shutting-down of the moved parts or the initiation of an emergency operation program is insured.

Another object of the present invention resides in a safety arrangement comprising electric switch elements arranged and designed such that in the event of collision motion energy may be accepted at the persons or objects without the occurrance of large forces thereat.

To attain these objects the present invention provides a safety arrangement for systems with parts freely movable spatially in particular for manipulation devices and driverless transportation devices, including electric switch elements which upon collision of moved parts with persons or objects cause a control signal which shuts down the moved parts or initiates an emergency operation program which causes for instance a sequence of movements opposite to the direction of collision, wherein each of the electric switch elements is constituted by a per se known initially electrically insulating plastic layer which turns electrically conductive upon being pressure strained and which is provided planarly between two electrode layers at those locations of the moved parts which as a result of their shapes and motion energy represent a risk upon collision.

It is insured by the planar distribution of the electric switch elements at the cited locations that basically in all feasible instances of collision the motion of the parts is stopped or for instance reversed.

As a result of the multi-layer construction of the electric switch elements, a specially simple and pliable arrangement is obtained. Commercial forms of the plastic layer electrically conducting upon being pressure strained are known under the commercial names "DYNACON" and "SENSOPRESS" and described in prospectus of the companies "DYNACON INDUSTRIES" of Leonia, N.J., U.S.A., as well as "ORCUS INTERNATIONAL" (German Agent ITC 6343 Frohnhausen).

BRIEF DESCRIPTION OF THE DRAWING

An embodiment of a safety arrangement for systems having parts spatially moved will now be described by way of example and with reference to the accompanying schematic drawing in which.

DESCRIPTION OF THE PREFERRED EMBODIMENT

Figure 1:
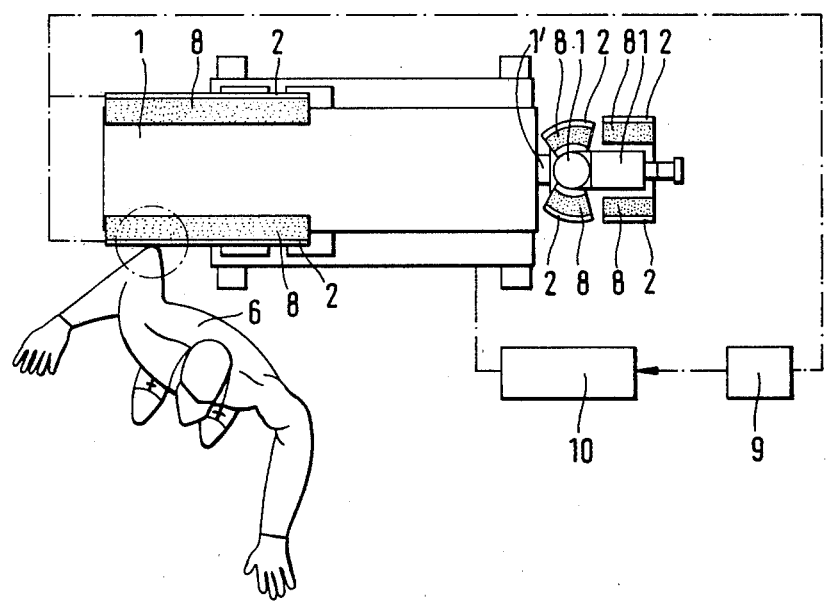
FIG. 1 is a top plan view of a safety arrangement for an industrial roboter.

FIG. 1 shows an industrial roboter used for instance for the manipulation of workpieces. The roboter has moved parts 1 (rotating) and 1' (reciprocating). At the surfaces of the moved parts 1 and 1' representing a risk for an object 6 to be protected, for instance an operator, in the event of a collision by virtue of their positions, their shapes and their motion energy, electric switch elements 2 are distributed planarly.

Figure 2:
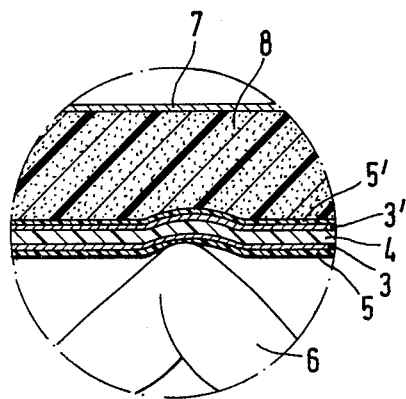
FIG. 2 is a sectional view, on an enlarged scale, of a detail of an electric switch element used in the arrangement according to FIG. 1 with underlaid foam padding.

The electric switch elements 2 each comprise, as will be particularly noted from FIG. 2, an initially electrically insulating plastic layer 4 which becomes electrically conductive upon pressure straining, said plastic layer 4 being arranged between two planar electrode layers 3 and 3', for instance metal foils or metal grids. In the operative condition, the electrode layers 3 and 3' are subject to a different voltage and connected via correlating electronics 9 to a control means 10 which upon passing of an electrical current through the plastic layer 4 releases a signal shutting down the moved parts 1 and 1' or initiating an emergency operation program. The electrode layers 3 and 3' are covered at their surfaces remote from the plastic layer 4 by respective plastic films 5 and 5' which on the one hand protect the electrode layers 3 and 3' against damaging and of which on the other hand at least the outer plastic film 5 indicates the effectiveness region of the safety arrangement by a striking coloring. It is, however, also advantageous to make the electrode layers 3 and 3' of unilaterally metallized plastic films the metallized surfaces of which are directed toward the initially electrically insulating plastic layer.

Between the electric switch elements 2 and the moved parts 1 and 1' or on the topsides of the electric switch elements 2, there is respectively a resilient or plastically deformable layer 8 which is for instance bonded to the machine housing 7. It is to be achieved by this layer 8 that firstly the switch point is shifted as far as possible forwardly in direction of movement of the moved parts 1 and 1' (before there is a direct contact of the hard machine parts with the object), that secondly the force resulting from the motion energy acts upon a surface as large as possible, in order to keep the pressure low to be experienced for instance by an operator, and that finally a part of the motion energy is converted into other forms of energy not harming man, e.g. deformation work. This may for instance be accomplished by a padding layer of resilient polyurethane integral foam or of a plastically deformable body consisting of aluminum sheet, wood, cardboard or plastic in cell structures. The deformable layer 8 is arranged in such a way that it also covers protruding parts such as screws or flanges and sharp edges in a sufficient thickness.

Instead of totally planar electric switch elements the electric switch elements may also be divided into individual structural elements with small dimensions which are applied juxtaposed on the surface of the moved parts 1 and 1' and are connected electrically in parallel. In this way, even large and strongly curved surfaces may be provided with electric switch elements.

By means of the correlating electronics 9 formed as switching amplifier, the minimum pressure required for a signal generation at the electric switch elements 2 may be set indefinitely variable.

Instead of the plastic layer 4 electrically conductive upon pressure straining, a displaceable material, for instance an electrically insulating liquid may be provided between the planarly formed pliable electrode layers 3 and 3' of the electric switch elements 2, said liquid upon deformation of the electrode layers 3 and 3' as a result of an impact permits a contacting of the electrode layers, thereby the control means 10 being switched on.

The invention may be embodied in other specific forms without departing from the spirit or the essential characteristics thereof. The embodiment is therefore to be considered in all respects as illustrative and not restrictive.

What I claim is:

1. A manipulation or driverless transportation device comprising at least one electrical switch means, electrical control means, and means connecting said switch means to said control means, said switch means being arranged at those locations on said device where said switch means is actuated, upon collision of said device and contact of said switch means with a person or object, to cause said control means to shut off the movement of said device or initiate an emergency operation program causing a sequence of movements opposite to the direction of said collision, said switch means comprising at least one planar laminate on the surfaces of those parts of said device which will contact said person or object upon collison therewith, said laminate comprising a continuous layer of a normally electrically insulating plastic material which becomes electrically conductive upon being compressed, a continuous, electrically conductive layer contiguous to each of the opposite surfaces of said normally electrically insulating plastic material layer, and a deformable layer for receiving impact energy and extending along the side of one of said electrically conductive layers opposite said normally electrically insulating plastic material layer, whereby said switch means may be actuated and an electrical circuit may be closed upon compression of said laminate at any and all points therealong.

2. A device as set forth in claim 1 wherein said laminate further comprises an insulating plastic film extending along the side of each of said electrically conductive layers opposite said normally electrically insulating plastic material layer.

3. A device as set forth in claim 1 wherein said electrically conductive layers each comprise a unilaterally metallized plastic film, the metallized surface thereof facing said normally electrically insulating plastic material.

4. A device as set forth in claim 1 wherein said switch means comprises a plurality of said planar laminates on said surfaces of said parts of said device, said electrically conductive layers of said planar laminates being electrically connected in parallel.

5. A device as set forth in claim 4 wherein said surfaces are curved surfaces.

* * * * *